(12) United States Patent
Huang et al.

(10) Patent No.: US 9,238,482 B2
(45) Date of Patent: Jan. 19, 2016

(54) ROAD HOLDING ABILITY MECHANISM FOR THE TWO FRONT WHEELS OF A MOTORCYCLE

(71) Applicant: Aeon Motor Co., Ltd., Tainan (TW)

(72) Inventors: Huei-Huay Huang, Tainan (TW); Chin-Chi Lin, Tainan (TW)

(73) Assignee: AEON MOTOR CO., LTD., Tainan (TW)

( * ) Notice: Subject to any disclaimer, the term of this patent is extended or adjusted under 35 U.S.C. 154(b) by 0 days.

(21) Appl. No.: 14/456,533

(22) Filed: Aug. 11, 2014

(65) Prior Publication Data

US 2014/0346753 A1 Nov. 27, 2014

Related U.S. Application Data

(63) Continuation-in-part of application No. 13/584,858, filed on Aug. 14, 2012, now abandoned.

(51) Int. Cl.
| | |
|---|---|
| *B62K 5/08* | (2006.01) |
| *B62D 9/04* | (2006.01) |
| *B60G 3/20* | (2006.01) |
| *B62K 5/10* | (2013.01) |

(52) U.S. Cl.
CPC .. *B62D 9/04* (2013.01); *B60G 3/20* (2013.01); *B62K 5/08* (2013.01); *B62K 5/10* (2013.01); *B60G 2300/122* (2013.01); *B60G 2300/45* (2013.01)

(58) Field of Classification Search
CPC .............. B62K 5/10; B62K 5/08; B62D 9/04
See application file for complete search history.

(56) References Cited

U.S. PATENT DOCUMENTS

| | | | | | |
|---|---|---|---|---|---|
| 4,685,690 | A | * | 8/1987 | Fujita et al. | 280/124.103 |
| 6,367,824 | B1 | * | 4/2002 | Hayashi | 280/62 |
| 6,817,617 | B2 | * | 11/2004 | Hayashi | 280/5.509 |
| 7,487,985 | B1 | * | 2/2009 | Mighell | 280/124.103 |
| 7,530,419 | B2 | * | 5/2009 | Brudeli | 180/210 |
| 7,568,541 | B2 | * | 8/2009 | Pfeil et al. | 180/210 |
| 7,591,337 | B2 | * | 9/2009 | Suhre et al. | 180/210 |
| 7,631,721 | B2 | * | 12/2009 | Hobbs | 180/348 |
| 8,016,302 | B1 | * | 9/2011 | Reeve | 280/62 |
| 8,070,172 | B1 | * | 12/2011 | Smith et al. | 280/124.103 |
| 2006/0255550 | A1 | * | 11/2006 | Pfeil et al. | 280/5.509 |

* cited by examiner

*Primary Examiner* — Kevin Hurley
*Assistant Examiner* — Gabriela C Craciun
(74) *Attorney, Agent, or Firm* — Bacon & Thomas, PLLC

(57) ABSTRACT

The present invention provides a road holding ability mechanism applied to a motorcycle with two wheels in front. The mechanism may be configured on a three-wheeled motorcycle which has two front wheels and a single rear wheel or on a four-wheeled motorcycle with two front wheels as well as two rear wheels. Under any operating condition, the mechanism enables the two front wheels to offer great road holding ability, that is, to remain stable when moving so as to ensure the motorcycle against rollovers. The present invention includes a simple and innovative structure.

2 Claims, 12 Drawing Sheets

ROAD HOLDING ABILITY MECHANISM FOR THE TWO FRONT WHEELS OF A MOTORCYCLE

CROSS REFERENCE TO RELATED APPLICATIONS

This application is a continuation-in-part of U.S. patent applications Ser. No. 13/584,858, entitled "Road Holding Ability Mechanism For The Two Front Wheels of A Motorcycle" and filed on Aug. 14, 2012.

BACKGROUND OF THE INVENTION

1. Field of the Invention

The present invention generally relates to a road holding ability mechanism for a motorcycle with two wheels in front, in particular, to a mechanism which may control the two front wheels to turn/travel toward the desired course, to tilt and to move up and down in an upright manner. The present invention includes a simple and innovative structure.

2. Description of the Prior Art

A three-wheeled motorcycle is commonly provided with a single rear wheel and two front wheels consisting of a right front wheel as well as a left front wheel. A four-wheeled scooter includes two front wheels arranged with a right front wheel as well as a left front wheel and two rear wheels consisting of a right rear wheel as well as a left rear wheel. A three-wheeled or four-wheeled motorcycle offers more stability and safety than a two-wheeled motorcycle with a single front wheel and a single rear wheel. When cornering and encountering inclined or uneven and bumpy road surfaces, especially the road surface with height-differences, the surfaces of the two front wheels need to keep in contact with the ground surface to allow the two front wheels to remain stable so as to enable the motorcycle to be able to steer safely to avoid rollovers. As disclosed in the prior art, Taiwan invention patent number I 331973, the three-wheeled scooter with a road holding ability mechanism for the front wheels is provided with a steering and suspension mechanism to prevent the wheels from being off the ground so as to avoid rollovers when the vehicle/scooter/motorcycle corners and tilts. The structure of said prior art is built of linkages, that is, said prior art includes plenty of structure assemblies, so its product cost is high. However, the present invention includes a simple and innovative structure that may save product cost.

SUMMARY OF THE INVENTION

It is a primary object of the present invention to provide a road holding ability mechanism having a simple structure for the two front wheels of a motorcycle to allow the two front wheels to maintain their great road holding ability so as to stay stable under any operating condition.

According to the main feature of the present invention, the mechanism is arranged with two front wheel brackets for supporting the two front wheels. Each front wheel bracket is respectively coupled with a connecting arm secured to a connecting base. The connecting base and a steering shaft that directs the front wheels to a desired direction of motion are controlled by a control system so as to enable the connecting base to be able to tilt simultaneously with the steering shaft when the steering shaft tilts. Besides, the connecting base will stay fixed and remain in the same place when the steering shaft performs in-place clockwise or counterclockwise rotation. Each of the two connecting arms, on the top surface thereof, is respectively configured with a shock absorber pivotally connected with the motorcycle frame, and the buffer action forces from both of the shock absorbers are controlled by a tilting system. When the two front wheels move/travel, the buffer action forces from both of the shock absorbers may not only complement each other but also restrict each other so as to allow the front wheels to keep in contact with the ground surface. The steering shaft for controlling the direction of the two front wheels' motion is coupled with an anchor plate which may simultaneously operate together with the steering shaft. The anchor plate is arranged with a right steering linkage and a left steering linkage respectively connected to the relative front wheel bracket so as to enable the handlebar to be able to control the direction of the two front wheels' motion. In addition, the connecting base is provided in coupling with an extension plate which may simultaneously perform together with the connecting base. The extension plate, on each of both sides thereof, is respectively configured with a linkage which is attached to the relative front wheel bracket and may drive the relative front wheel to tilt, so that the two linkages may drive the two front wheels to tilt simultaneously when the steering shaft tilts.

BRIEF DESCRIPTION OF THE DRAWINGS

In order that the present invention may be more fully understood, a preferred embodiment thereof will now be described with reference to the accompanying drawings, in which.

DESCRIPTION OF THE PREFERRED EMBODIMENTS

The means for achieving the aforesaid objective and the functions of the present invention will become apparent from the following description, taken in connection with the accompanying drawings, wherein a preferred embodiment of the present invention is disclosed.

Figure 1:
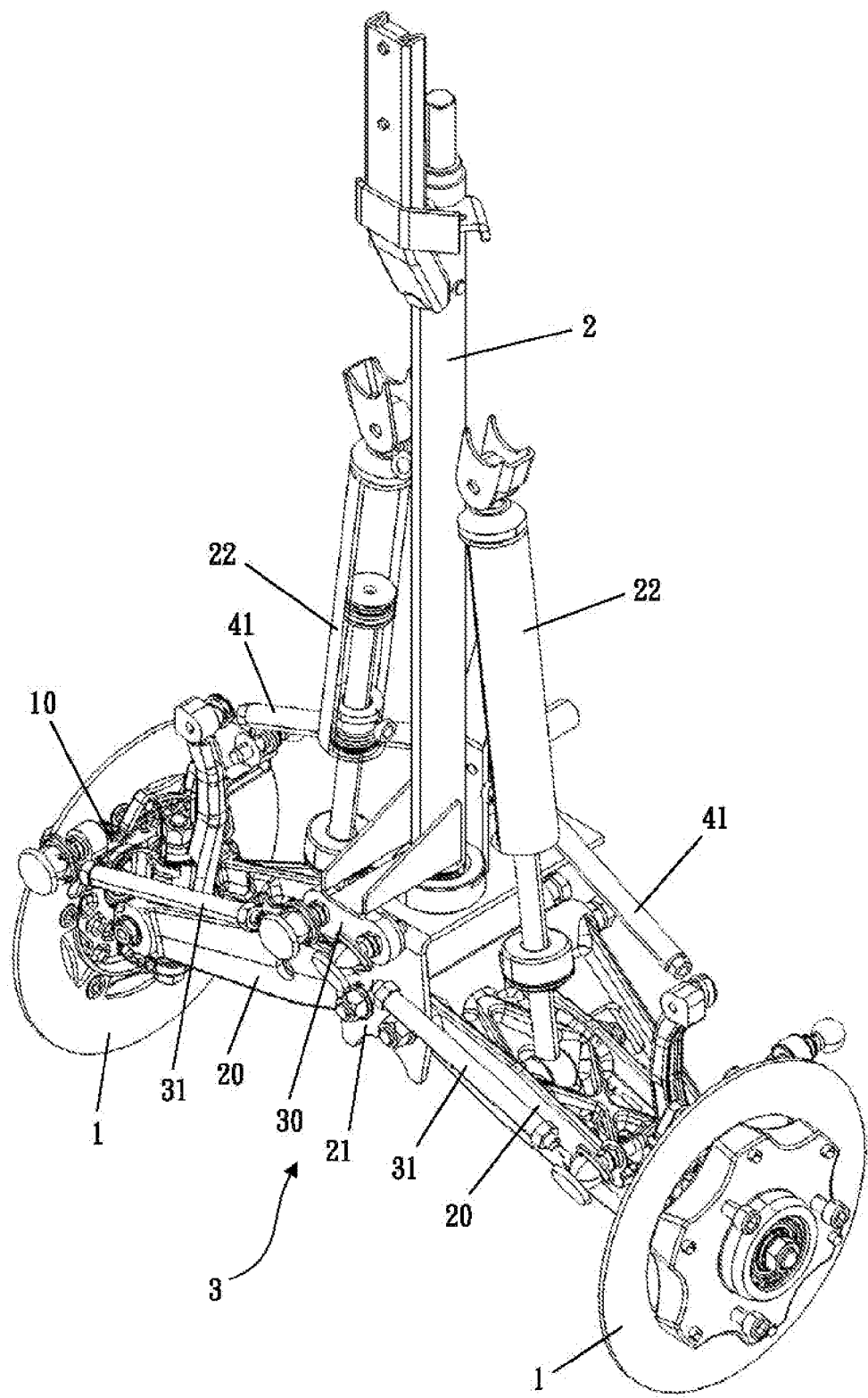
FIG. 1 is a stereogram showing the structure of the front-wheel portion according to the preferred embodiment of the present invention.
Figure 3:
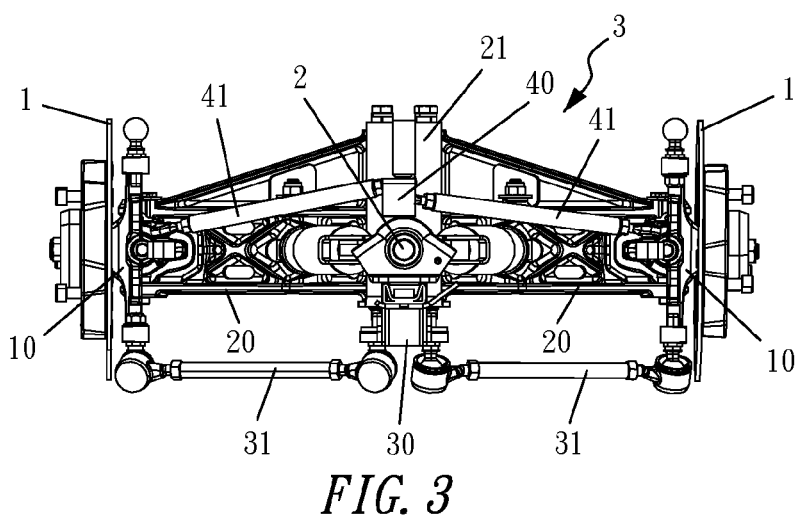
FIG. 3 is a top view showing the structure of the front-wheel portion according to the preferred embodiment of the present invention.
Figure 2:
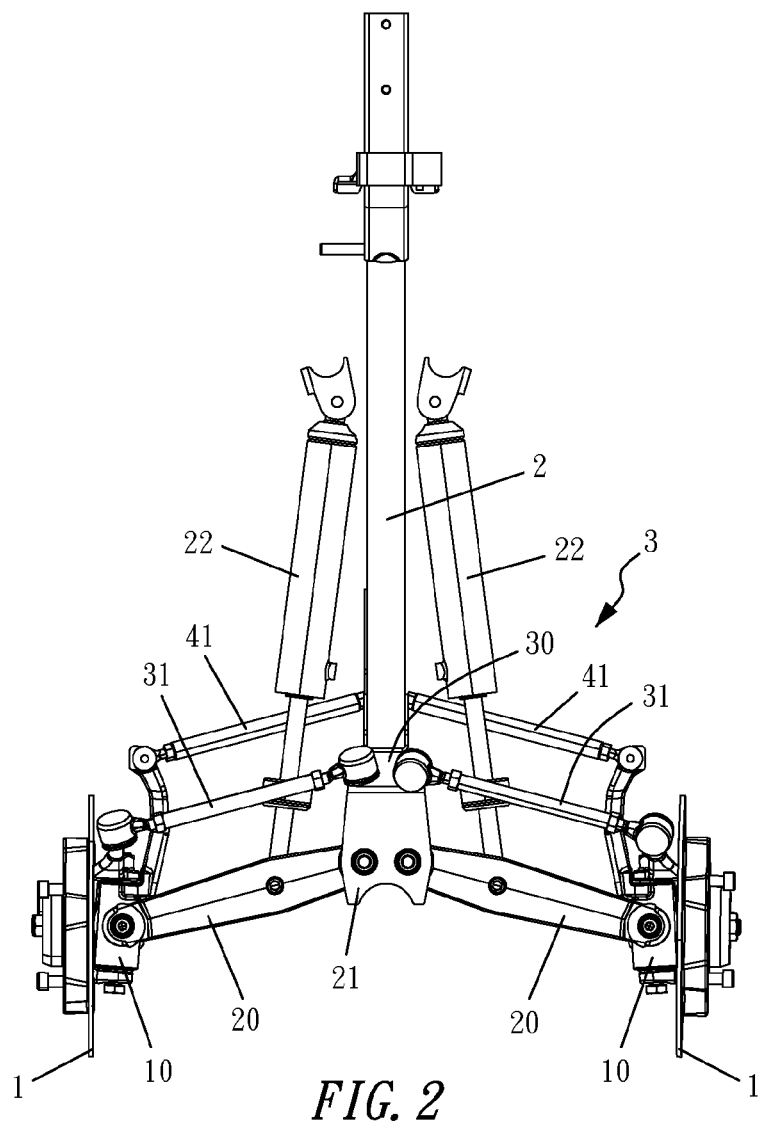
FIG. 2 is an elevation showing the structure of the front-wheel portion according to the preferred embodiment of the present invention.
Figure 5:
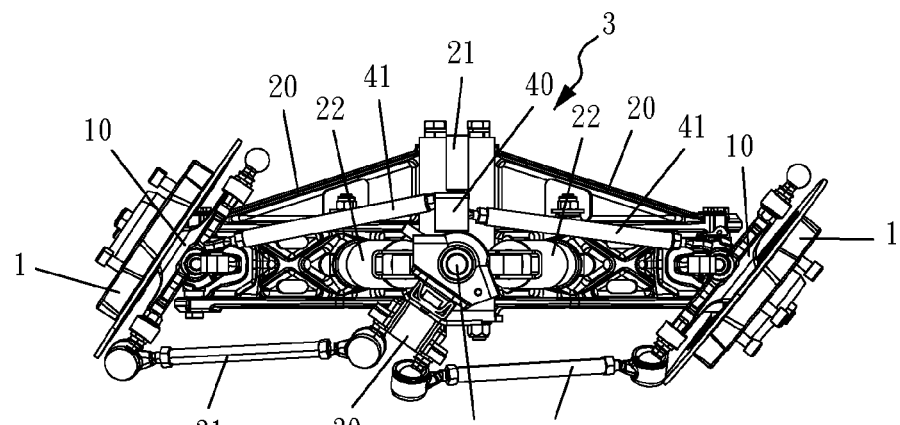
FIG. 5 is a top view showing the front wheels turning left according to the preferred embodiment of the present invention.
Figure 4:
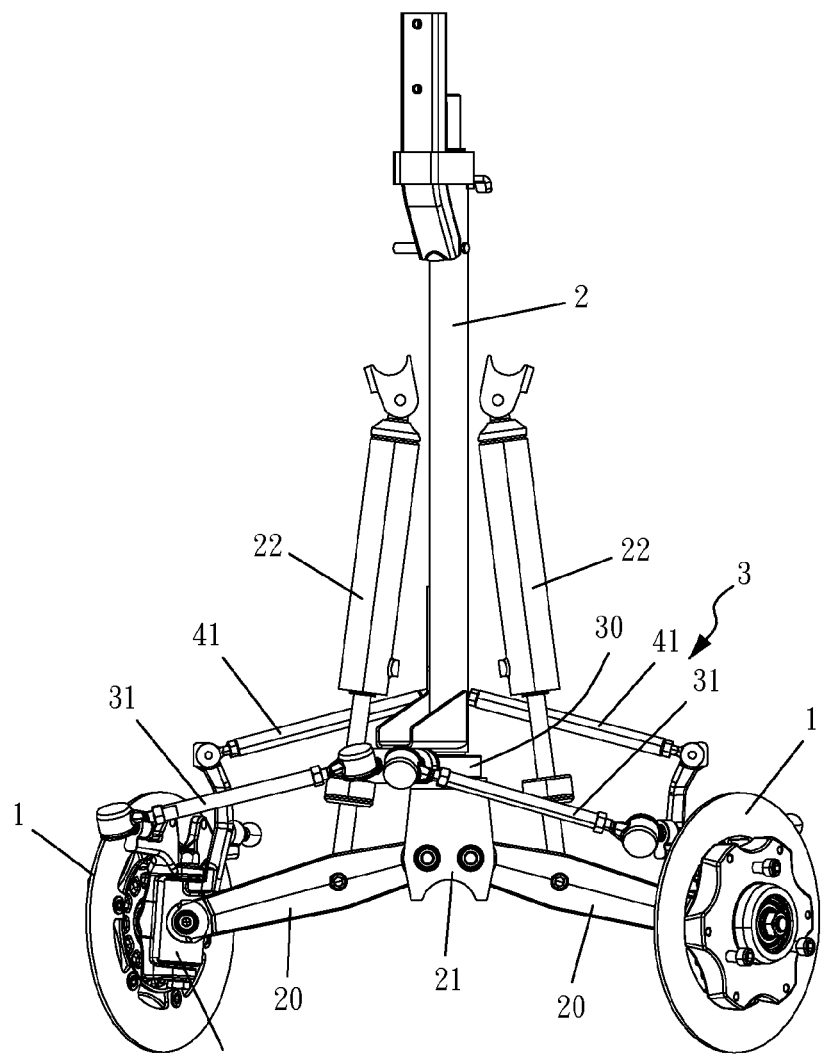
FIG. 4 is an elevation showing the front wheels turning left according to the preferred embodiment of the present invention.
Figure 7:
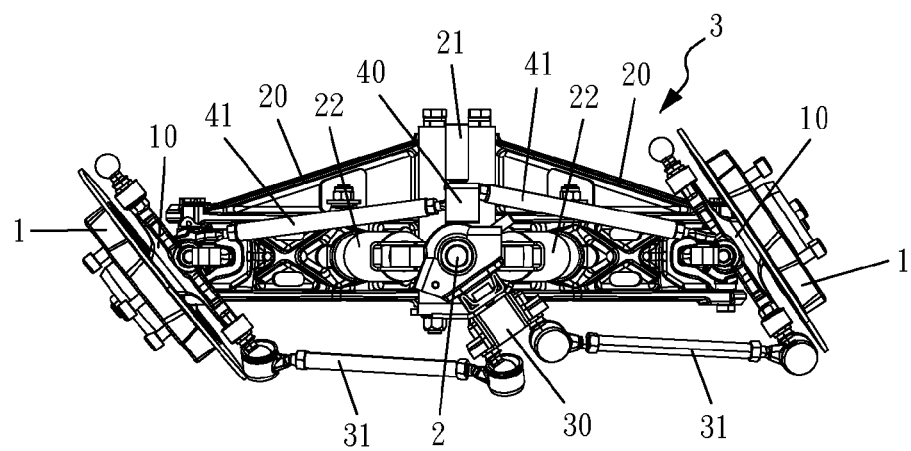
FIG. 7 is a top view showing the front wheels turning right according to the preferred embodiment of the present invention.
Figure 6:
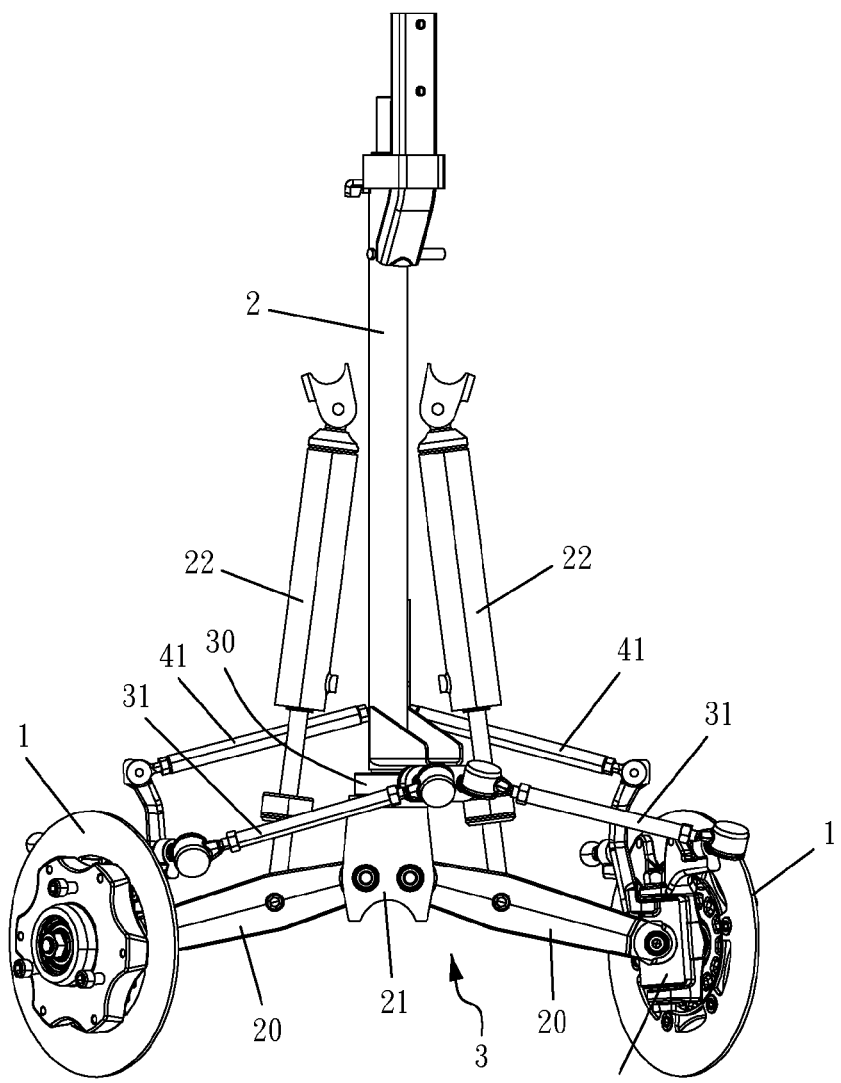
FIG. 6 is an elevation showing the front wheels turning right according to the preferred embodiment of the present invention.
Figure 9:
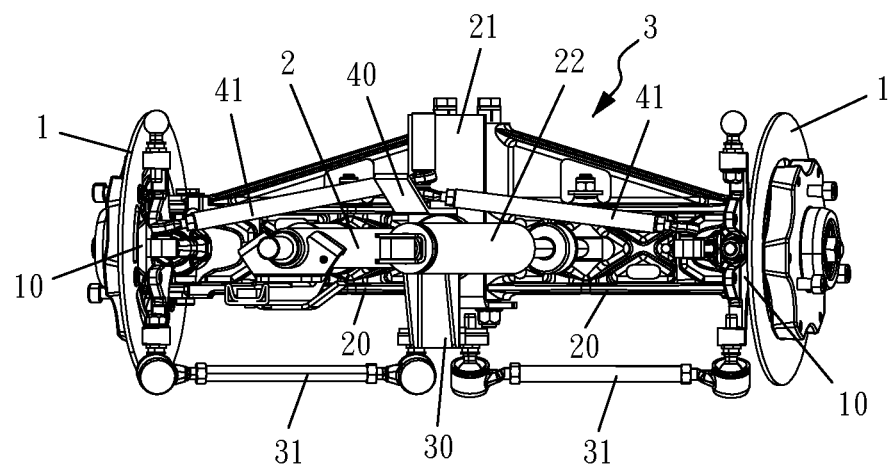
FIG. 9 is a top view showing the front wheels tilting to the left according to the preferred embodiment of the present invention.
Figure 8:
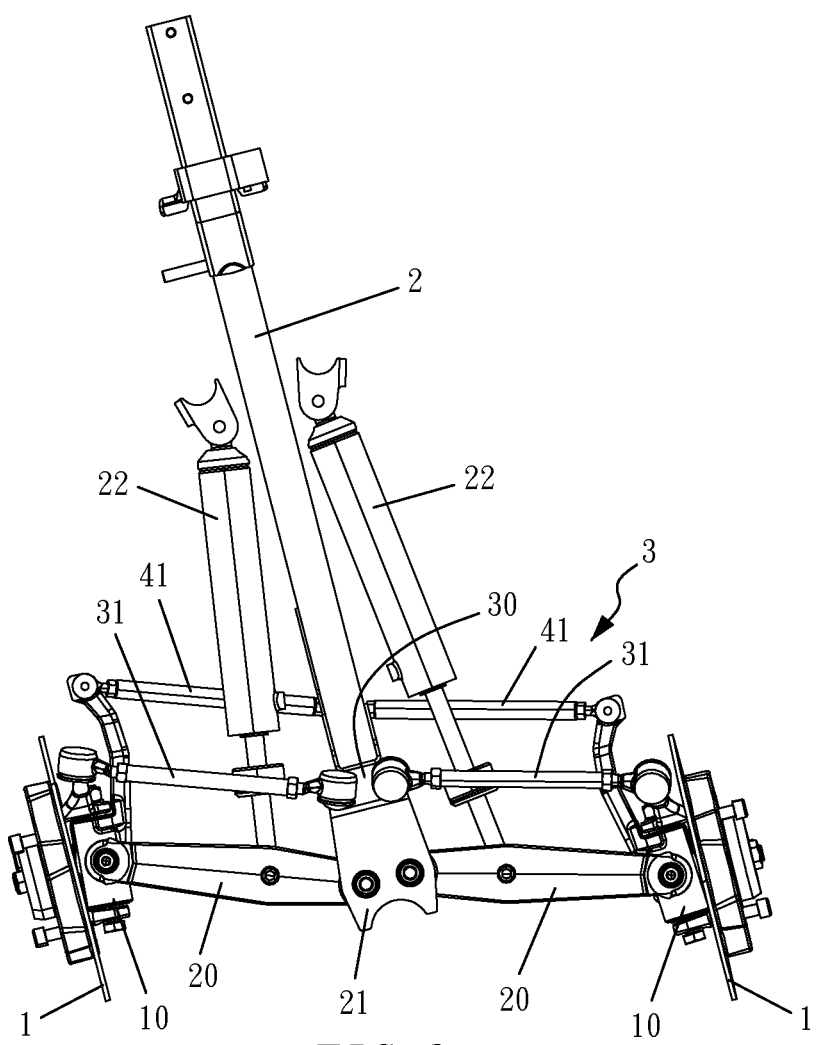
FIG. 8 is an elevation showing the front wheels tilting to the left according to the preferred embodiment of the present invention.
Figure 11:
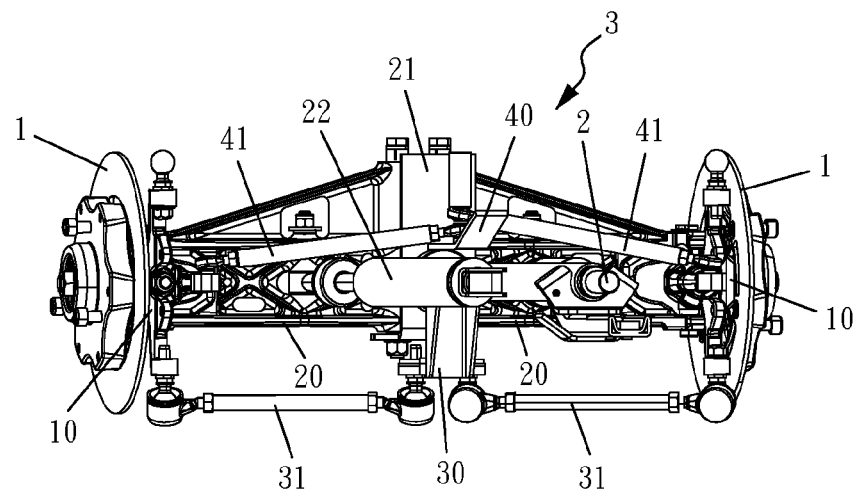
FIG. 11 is a top view showing the front wheels tilting to the right according to the preferred embodiment of the present invention.
Figure 10:
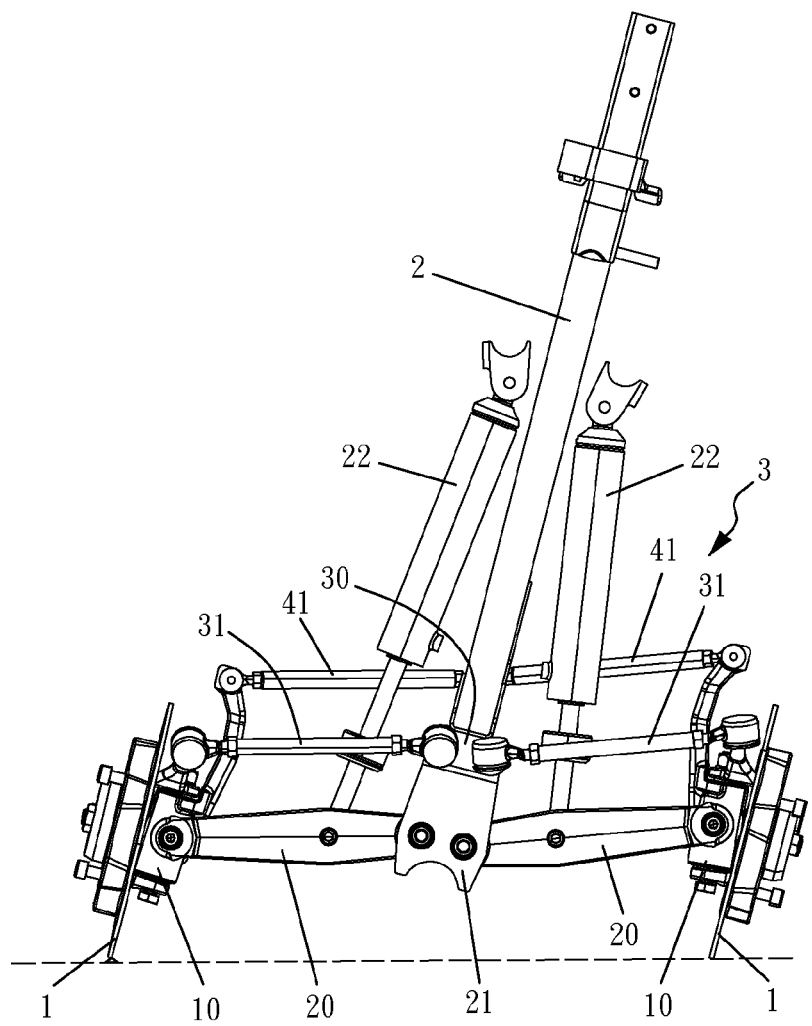
FIG. 10 is an elevation showing the front wheels tilting to the right according to the preferred embodiment of the present invention.
Figure 13:
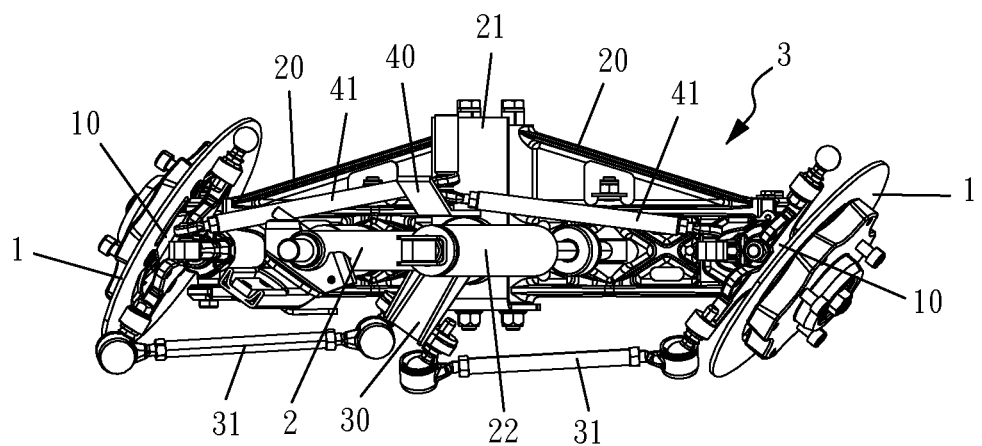
FIG. 13 is a top view showing the front wheels tilting to the left and turning according to the preferred embodiment of the present invention.
Figure 12:
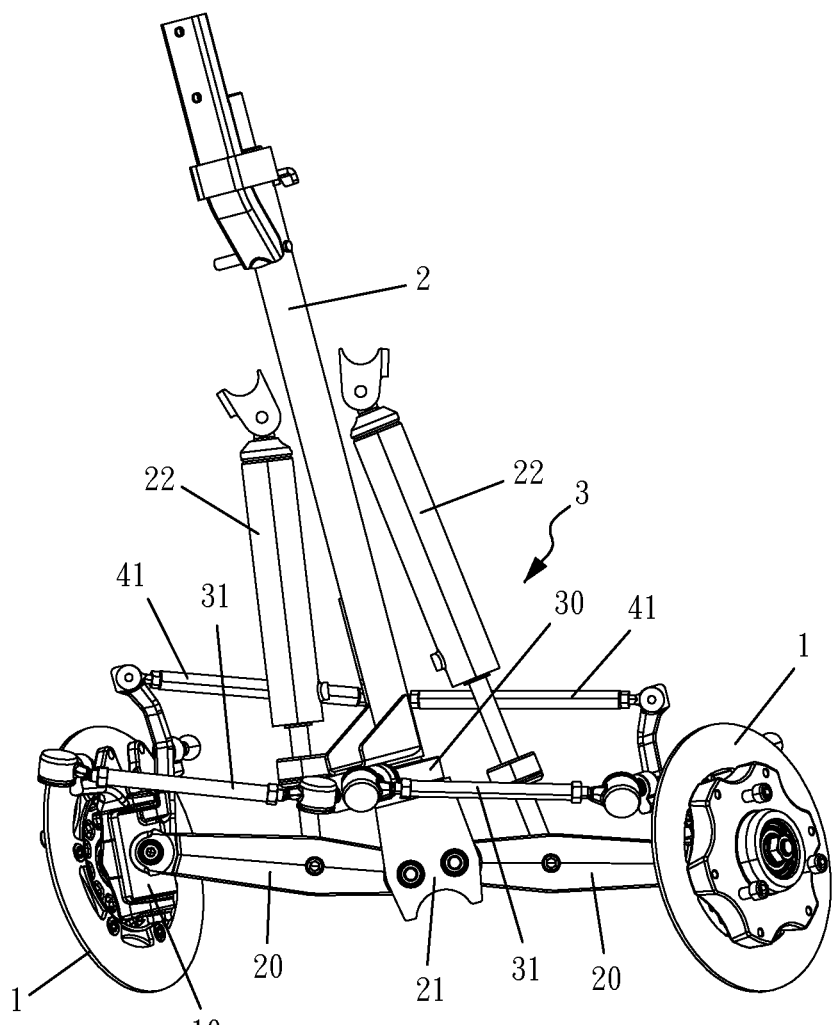
FIG. 12 is an elevation showing the front wheels tilting to the left and turning according to the preferred embodiment of the present invention.
Figure 15:
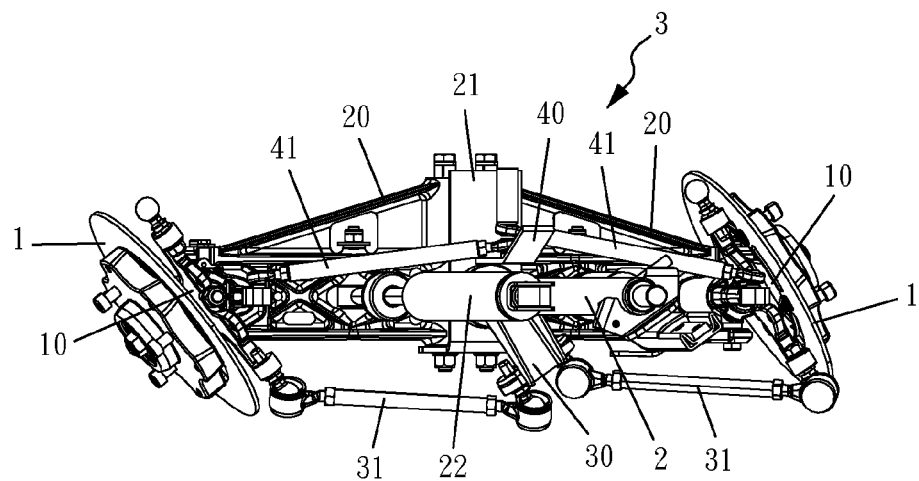
FIG. 15 is a top view showing the front wheels tilting to the right and turning according to the preferred embodiment of the present invention.
Figure 14:
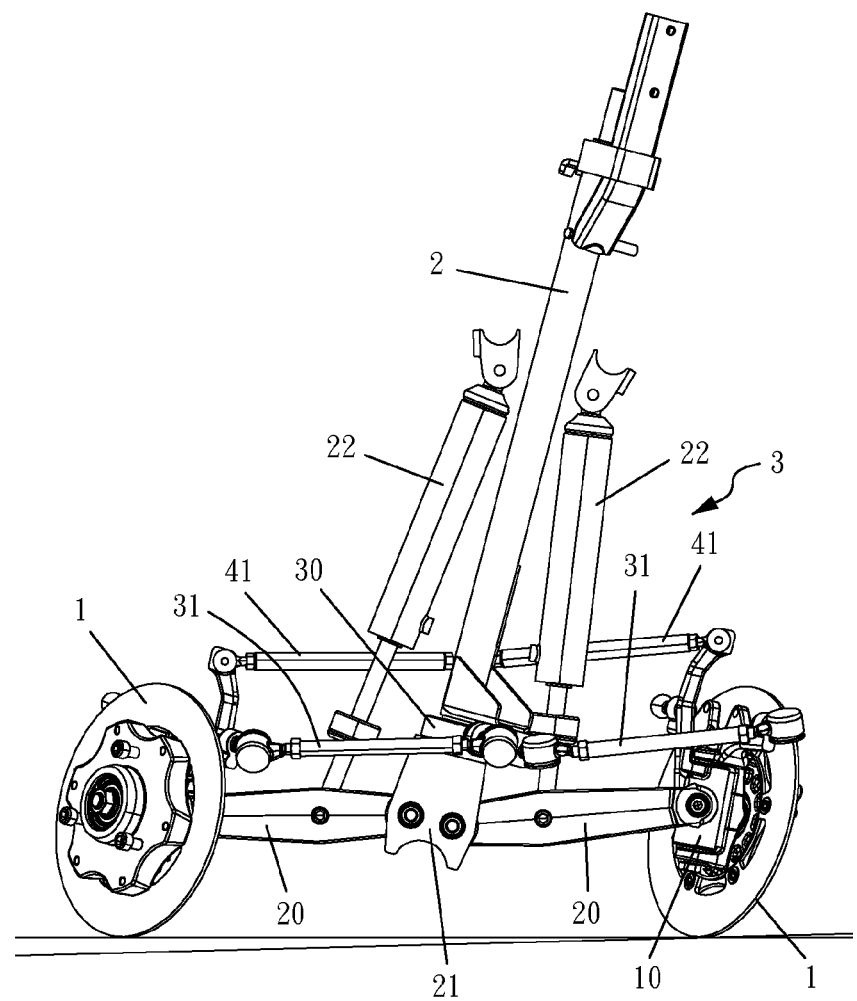
FIG. 14 is an elevation showing the front wheels tilting to the right and turning according to the preferred embodiment of the present invention.

Firstly, the motorcycle with two wheels in front disclosed in the present invention is the motorcycle having two front wheels 1 consisting of a right front wheel and a left front wheel (The outer tires are not depicted in the figures.), and a single rear wheel or two rear wheels respectively arranged on the right side and the left side. Referring to FIGS. 1 to 3, the present invention, the road holding ability mechanism (a tilting, steering and suspension mechanism) for controlling the two front wheels 1 comprises two front wheel brackets 10 for supporting the two front wheels 1 respectively coupled with a connecting arm 20 which is secured to a connecting base 21 between the connecting arms, wherein the connecting base 21 and the bottom end of a steering shaft 2 of the motorcycle handlebar for directing the front wheels 1 to turn/travel toward a desired direction of motion are managed by a control system 3 so as to control the connecting base 21 not only to be able to tilt simultaneously with the steering shaft 2 when the shaft 2 tilts but also to be able to stay fixed in the same place without turning simultaneously with the steering shaft 2 when the shaft 2 performs in-place clockwise or counterclockwise rotation, wherein the control system 3 are provided with two hydraulic dampers 22 (shock absorbers), and each hydraulic damper 22 (shock absorbers) has one end pivotally connected with the top surface of the relative connecting arm 20 and the other end configured with a tilting system 50,wherein the tilting system 50 is arranged between the two hydraulic dampers 22 and the buffer action forces of both hydraulic dampers 22 (shock absorbers) are interconnected via the tilting system so as to enable the buffer action forces from both of the hydraulic dampers 22 not only to complement each other but also to restrict each other when the two front wheels 1 move/travel, an anchor plate 30 attached to the steering shaft 2 so as to be able to simultaneously operate together with the shaft 2 and arranged with a right steering linkage 31 as well as a left steering linkage 31 which are respectively connected to the relative front wheel bracket 10, and an extension plate 40 (as shown in FIG. 3 and FIG. 5) which is provided in coupling with the connecting base 21 so as to be able to simultaneously perform together with the connecting base 21 and which is configured with a right linkage 41 and a left linkage 41 respectively attached to the relative front wheel bracket 10.

Figure 16:
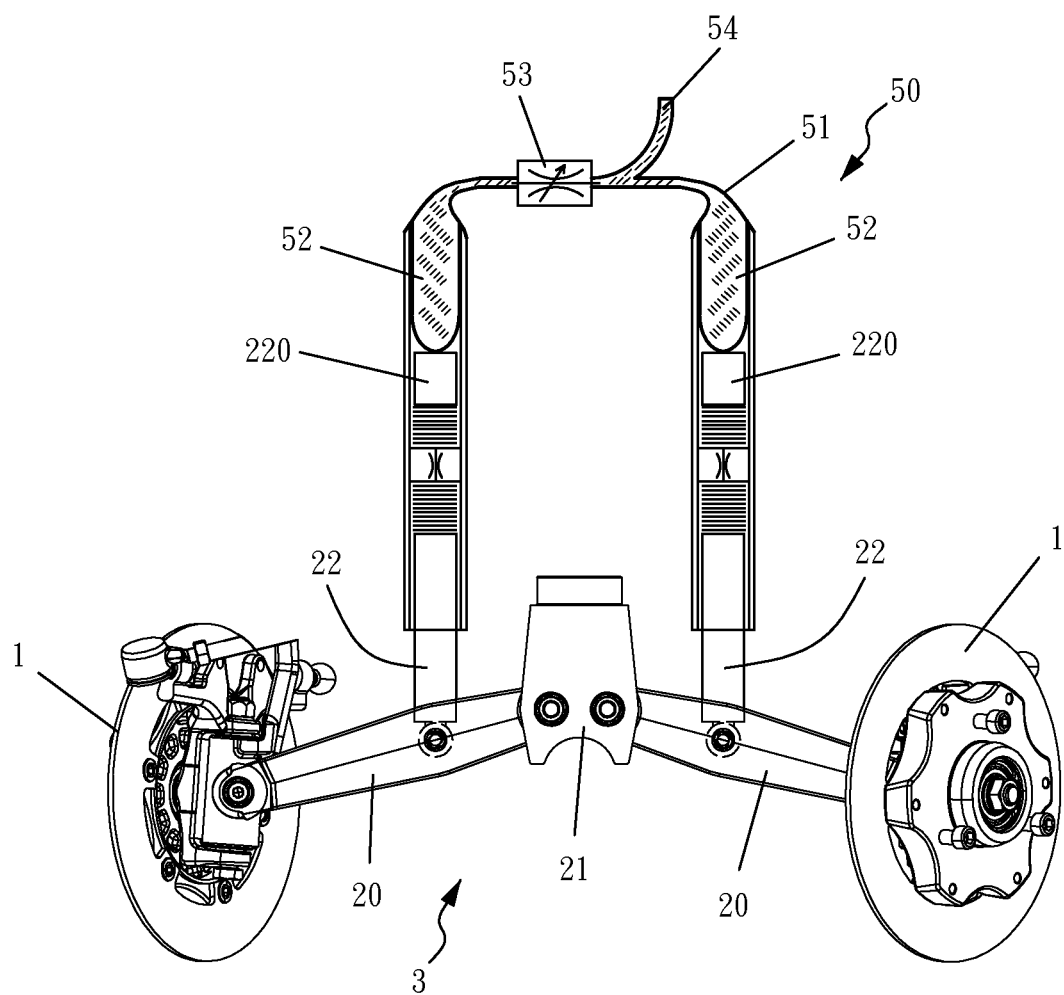
FIG. 16 is a structure schematic diagram of the tilting system configured between the two shock absorbers according to the preferred embodiment of the present invention.
Figure 17:
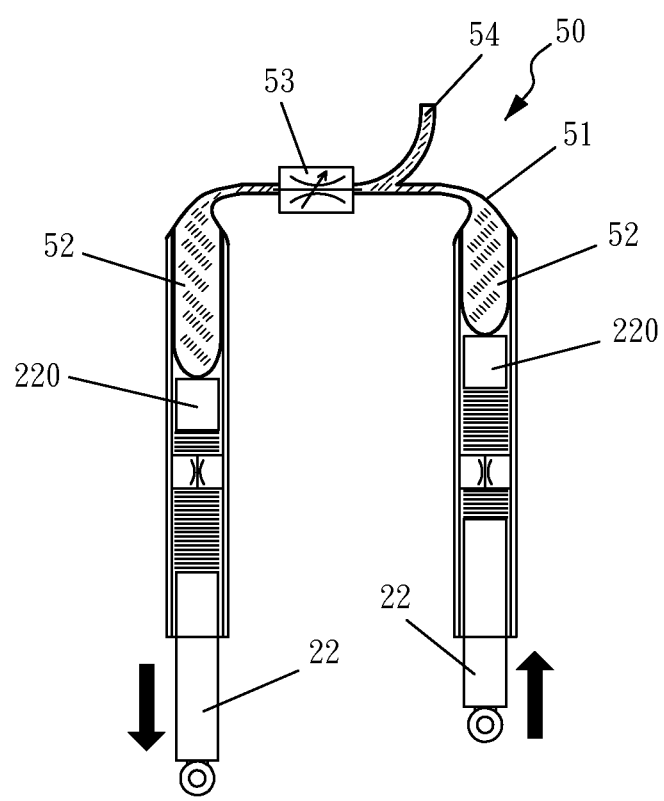
FIG. 17 is a schematic diagram showing the changes of the two shock absorbers and the tilting system in action when the two front wheels travel on a road having a drop height between the right and left sides according to the preferred embodiment of the present invention.
Figure 18:
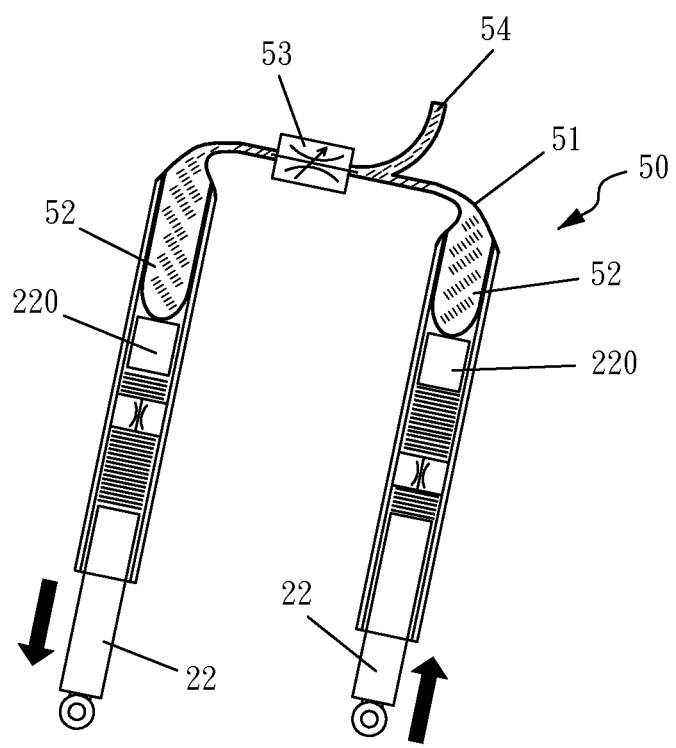
FIG. 18 is a schematic diagram showing the changes of the two shock absorbers and the tilting system in action when the two front wheels travel on an inclined road according to the preferred embodiment of the present invention.
Figure 19:
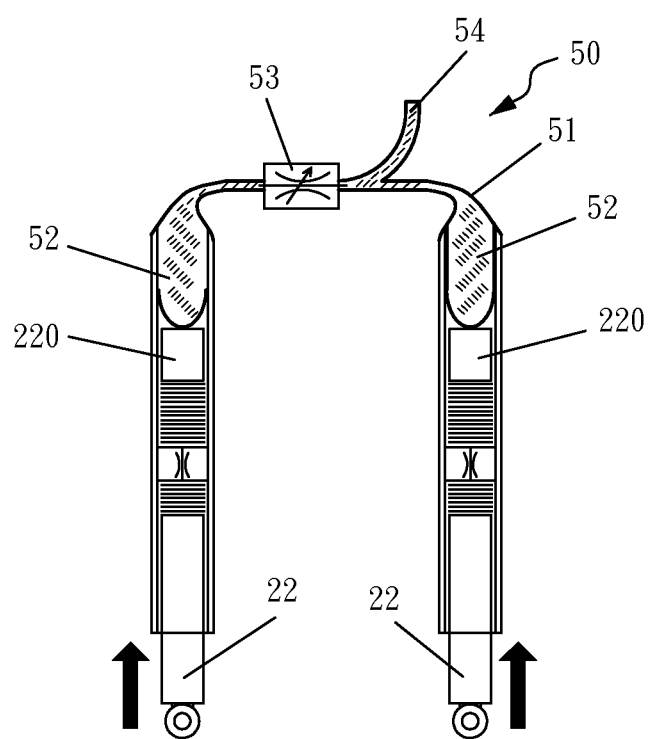
FIG. 19 is a schematic diagram showing the changes of the two shock absorbers and the tilting system in action when the two front wheels travel on a concavity of the road according to the preferred embodiment of the present invention.

Referring to FIG. 16, the tilting system 50 includes an air cell 51 of which the interior is filled with compressed air 52 and of which both ends are respectively placed into the interior of the hydraulic damper 22 so as to be allowed to touch the end part of a piston rod 220 of the hydraulic damper 22, a throttling valve 53 arranged in the middle section of the air cell 51, and an inflation inlet 54; wherein the throttling valve 53 may control the air flowing speed of both ends of the air cell 51, and moreover, the inflation inlet 54 allows the air to run into the air cell 51 so as to fill the interior of the air cell 51. When the piston rod 220 moves up and down, the throttling valve 53 may have different damping effects corresponding to various moving speeds of the piston rod 220. The hydraulic oil may push the piston rod 220 to squeeze the air cell 51 to allow the compressed air 52 to run through the throttling valve 53 so as to flow toward the piston rod 220 on the other side, that is, when the piston rod 220 on one side moves up, the piston rod 220 on the other side will move down; this is the way both the piston rods 220 work, as shown in FIG. 17. Therefore, even the motorcycle travels on a rough road having a drop height between the right and left sides, the motorcycle may also keep stable. When the motorcycle needs to be parked on an inclined road (a slope) which has a drop height between the right and left sides, the throttling valve 53 may be locked to stop the air 52 from running, and thus, the two front wheels 1 of the motorcycle may be locked so as to allow the motorcycle to be parked on the slope. Referring to FIG. 18, it is an action schematic diagram of the right piston rod 220 and the left piston rod 220 when the motorcycle tilts; it depicts that the motorcycle is in a state of tilting, and the piston rod on one side moves up, and thus, the piston rod on the other side moves down. Referring to FIG. 19, when the right piston rod 220 and the left piston rod 220 are pushed, the throttling valve 53 may have different damping effects corresponding to various moving speeds of the piston rods 220. The hydraulic oil of the hydraulic dampers 22 may push the piston rods 220 to squeeze the compressed air 52 within the air cell 51; according to the compressible feature of the air cell 51, the air cell 51 is allowed to receive the impact from the piston rods 220 so as to absorb the shock. Moreover, the air may stop running when the throttling valve 53 is locked, and thus, the two front wheels 1 of the motorcycle may be locked to be in a state of stopping or parking. Therefore, a user may stop/park the motorcycle by locking the throttling valve 53 instead of supporting the motorcycle by feet when stopping at the traffic lights.

FIGS. 1 to 3 shows a completed combination of the foresaid assemblies.

Referring to FIGS. 4 to 7, the anchor plate 30 operates together with the shaft 2 so as to actuate the two steering linkages 31 to direct the two front wheels 1 simultaneously to the desired direction when the steering shaft 2 turns/performs for driving the two front wheels 1 to travel toward a desired course.

Referring to FIGS. 8 to 11, when the front wheels 1 travel over bumpy roads and either encounters uneven and inclined road surfaces, especially the road surface with height differences, the front wheels 1 will move upward to drive the connecting arm 20 attached to the front wheel bracket 10 to move upward simultaneously. Thus, the hydraulic damper 22 on the side associated with the wheel encountering uneven and inclined road surfaces will generate the movement of compression and shock-absorption, and the hydraulic damper 22 on the other side will supply a downward pressure to its relative wheel 1 so as to keep the two front wheels 1 in contact with the ground surface because the hydraulic circuits of the two hydraulic dampers 22 are controlled by the tilting system 50. Moreover, a displacement occurs to the extension plate 40 when the steering shaft 2 tilts, so that the linkages 41 are pulled to drive the two front wheels 1 to tilt.

Referring to FIGS. 12 to 15, the steering shaft 2 is turned to drive the two steering linkages 31 to direct the two front wheels to a desired course when the front wheels 1 travel over an inclined road surface with height differences and make turns. Due to the inclined ground surface, the steering shaft 2 performs rotation, and the movement of the rotation causes the displacement of the extension plate 40 further to drive the front wheels 1 to tilt. In addition, the two hydraulic dampers 22 are managed by the tilting system 50 to absorb the shock impulses occurring to the front wheels 1 and enable the surfaces of the front wheels to maintain contact with the ground.

Moreover, the air within the air cell 51 may stop running when the throttling valve 53 of the tilting system 50 is locked, and thus, the two front wheels 1 may be locked to be in a state of stopping or parking. Therefore, a user may stop/park the motorcycle by locking the throttling valve 53 instead of supporting the motorcycle by feet when stopping at the traffic lights.

With respect to the above description, it is to be realized that the front wheels disclosed in the present invention, which may not only turn well on a flat road surface but also travel and turn well on an inclined road surface with height differences, may beautifully deal with any operating condition. Moreover, the present invention provides a simple and innovative structure that may reduce cost.

Therefore, the foregoing is considered as illustrative only of the principles of the present invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A road holding ability mechanism for the two front wheels of a motorcycle, comprising:

two front wheel brackets respectively coupled with a connecting arm secured to a connecting base between the connecting arms;

a steering shaft, wherein the connecting base and the steering shaft are managed by a control system so as to control the connecting base not only to be able to tilt simultaneously with the steering shaft when the shaft tilts but also to be able to stay fixed in the same place without turning simultaneously with the steering shaft when the shaft performs in-place clockwise or counterclockwise rotation;

two shock absorbers whose buffer action forces are interconnected via a tilting system and each of which has one end pivotally connected with the top surface of the relative connecting arm; wherein the tilting system further includes an air cell of which the interior is filled with compressed air and of which both ends may respectively touch the side providing the buffer action forces of the shock absorbers, a throttling valve arranged in the middle section of the air cell, and an inflation inlet, and wherein the throttling valve may control the air flowing speed of both ends of the air cell, and moreover, the inflation inlet allows the air to run into the air cell so as to fill the interior of the air cell;

an anchor plate attached to the steering shaft so as to be able to simultaneously operate together with the shaft and arranged with a right steering linkage as well as a left steering linkage which are respectively connected to the relative front wheel bracket; and an extension plate which is provided in coupling with the connecting base so as to be able to simultaneously perform together with the connecting base and which is configured with a right linkage and a left linkage respectively attached to the relative front wheel bracket.

2. The road holding ability mechanism for the two front wheels of the motorcycle as claimed in claim 1, wherein the shock absorbers are the hydraulic dampers, and the side providing the buffer action forces from the piston rods of the two hydraulic dampers may touch both ends of the air cell of the tilting system.

* * * * *